US005701330A

United States Patent [19]

Lippmann et al.

[11] Patent Number: 5,701,330
[45] Date of Patent: Dec. 23, 1997

[54] SERIAL COMMUNICATION METHOD AND APPARATUS

[75] Inventors: Raymond Lippmann, Ann Arbor; Michael John Schnars, Clarkston; James Edward Nelson, North Branch; James Robert Chintyan, Davison, all of Mich.

[73] Assignee: Delco Electronics Corporation, Kokomo, Ind.

[21] Appl. No.: 357,893

[22] Filed: Dec. 16, 1994

[51] Int. Cl.$^6$ ................................................. H04B 3/00
[52] U.S. Cl. ........................ 375/257; 375/353; 340/534; 340/825.5; 340/825.52
[58] Field of Search ........................... 375/219–222, 375/257, 287, 288, 316–317, 342, 353; 370/447, 462; 340/533–534, 537–538, 825.5, 825.51, 825.52

[56] References Cited

U.S. PATENT DOCUMENTS

| 3,779,321 | 12/1973 | Landwer et al. | 375/353 |
| 4,625,320 | 11/1986 | Butcher | 375/319 |

Primary Examiner—Young T. Tse
Attorney, Agent, or Firm—Jimmy L. Funke

[57] ABSTRACT

Two or more communication modules are coupled by a one wire transmission line. A feed module impresses dc power and a sine wave carrier signal on the line. Each module generates a square wave signal synchronous with the carrier, each period of the signal representing one data bit. Data is written onto the line by a module by attenuating the carrier wave for selected bits and read by another module by sampling the bits and detecting those which are attenuated. Address and message data is transmitted in packets of n bits, the first bit always being an attenuated bit. Addressing is accomplished by generating a sequence of n unattenuated bits and then writing packets of address data. An address is valid when it matches a stored address in a module and that module is then activated to read or write. Multiple addressing modules can be used with a priority technique which reserves a priority code location at the beginning of an address string and compares code bits of a sending module with carrier bits, and aborts the address write when the carrier has an attenuated priority bit and the sending module is attempting to send an unattenuated bit.

17 Claims, 5 Drawing Sheets

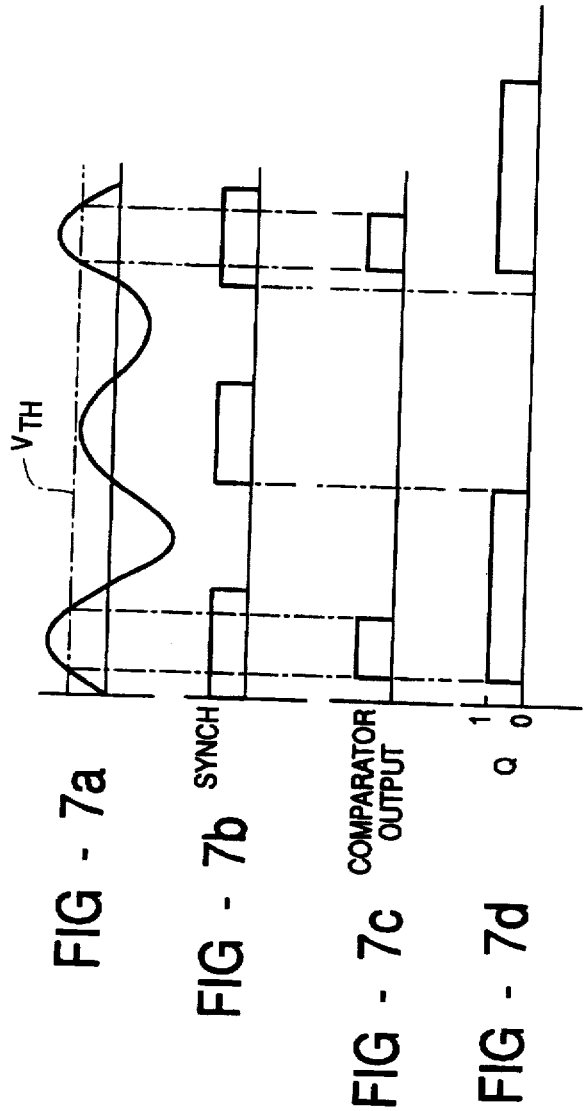
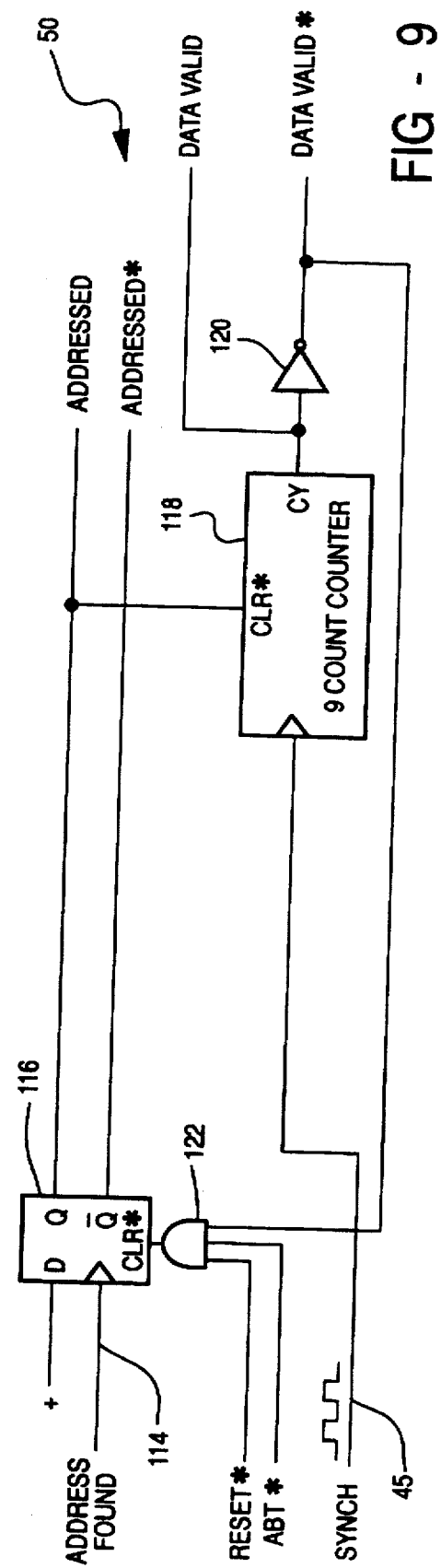

SERIAL COMMUNICATION METHOD AND APPARATUS

FIELD OF THE INVENTION

This invention relates to digital serial communications and particularly to a method and apparatus for affording power and data for a plurality of communication modules via a single wire.

BACKGROUND OF THE INVENTION

In systems employing a number of separate electronic devices it is known to provide communication between the devices by digital serial communication. In automotive vehicles, for example, there are a number of components such as an engine control module, an audio system module, a comfort control module, et cetera, each having its own microprocessor, and a common data link for purposes of fault diagnosis or control wherein data may be shared between any two modules or with some other device. Commonly, a single wire and a common ground transmits data among the modules and power is supplied separately to the communication interface at each module, either by another wire or by local connections to the components. Each component can supply clock pulses to the interface, but this gives rise to concerns of synchronization. It is known to use square wave pulses to carry data, using pulse width or some other property of the pulse to convey data values and using pulse edges for timing purposes. Radio interference is apt to arise from such pulses and strict controls on pulse rise and fall rates are needed to minimize such interference. At high data rates, faster rise and fall rates are required and harmonics of extremely high frequency are generated, resulting in very high electromagnetic radiation; in addition, the high frequency causes undesirable high impedances at inductive portions of the data link.

It is desirable to have a simpler communication link which is less dependent on the local components and which can serve components having no microprocessor or no clock. It is also highly desirable to avoid significant radio interference due to data transfer and to effect very high data rates.

SUMMARY OF THE INVENTION

It is therefore an object of the invention to link electronic devices for data transfer simply and with low radio interference, while achieving high data rate. Another object is to maintain full support of power and timing needs for such data transfer independently of the linked devices and without separate wiring.

Digital communication is afforded a plurality of separate electrical components by a data link having a plurality of communication modules, one for each component, a single wire and a common ground linking the modules, and a combined power and sine wave carrier feed for energizing the link. The energizing feed is not necessarily associated with any of the communication modules on the link. The energizing feed supplies a constant dc voltage to the wire for supplying power to each module, and a sine wave at a fixed frequency imposed on the dc voltage. The sine wave carrier is coupled to the wire through a small resistance so that it can be attenuated at a module by shunting the wire to ground through another small resistance. If the small resistances are equal in value the sine wave amplitude will be reduced by half. In contrast to square wave pulses, the simple sine wave avoids high frequency harmonics, thereby limiting radio interference and allowing high data rates.

The communication modules may vary in complexity according to their designed function, and the modules on a given link need not be the same. They do have in common the ability to sense the sine wave carrier and use the "zero crossing" to mark sine wave periods and to synchronize the various modules. Each period comprises a data bit and a binary value of 1 is assigned to bits comprising unattenuated sine waves and a value of 0 is assigned to bits of attenuated sine waves. At least one of the modules has the ability to write data on the link by selectively attenuating the sine wave bits. A sine wave is attenuated over the entire bit period. Thus by switching a resistance into and out of the circuit selective bits are attenuated to thereby transmit data over the link. At least one other of the modules has the ability to read the transmitted data by comparing the amplitude of the sine wave for each bit to a threshold and thereby determining whether the bit value is 1 or 0.

Various type of communication systems can be implemented on the link. A single pair master-slave arrangement is very simple, requiring minimal addressing. Such dedicated pair communication could be cost effective since only one sine generator is required per system. It is also practical to energize multiple links with a single sine generator and dc supply.

A master and multiple slaves may require individual addressing. Since the link transmits data by modifying an existing sinusoidal wave form, many standard mechanisms for denoting the beginning of an address cannot be used. Here it is proposed to use a packet of a fixed number of 1's, say nine 1's, to mark the beginning of an address. All data communications, including the address comprise equal size packets of bits, each starting with a 0 (alternatively, each ending with a zero); for example a packet will comprise nine bits but the first one will be zero to distinguish from an address marker and followed by eight data bits. Each address could have any desired number of packets. A module is provided with shift registers to receive a sequence of bits, a comparator to detect when nine consecutive 1's is received to verify the start of an address, a stored address code, and a comparator to determine a match of a string of bits in the shift registers and the stored code. When an address is verified, the following bits are read out as message data, the 0 at the beginning of each packet being discarded. Where the addressed module is to write data to the link, the data is latched into a shift register and sequentially clocked out via a transmission gate, the timing being synchronized by the sine wave carrier.

Multiple master contention busing employs a priority addressing system to determine which module is dominant if more than one attempt to write an address. This is carried out by using the first few bits of an address to establish priority. Since attenuation of a sine wave writes a 0 bit on the link, it cannot be overcome by a 1 bit. Thus a priority code with 0's occurring early in the data string will dominate one lacking such 0's. A logic circuit in each module which is attempting to write an address will abort the write attempt if a 0 appears on the line when it is trying to write a 1 bit.

BRIEF DESCRIPTION OF THE DRAWINGS

The above and other advantages of the invention will become more apparent from the following description taken in conjunction with the accompanying drawings wherein like references refer to like parts and wherein:

FIGS. 7a–7d are timing diagrams of signals in the FIG. 6 circuit;

FIG. 9 is a schematic diagram of a read enable circuit of FIG. 4; and

DESCRIPTION OF THE INVENTION

Figure 1:
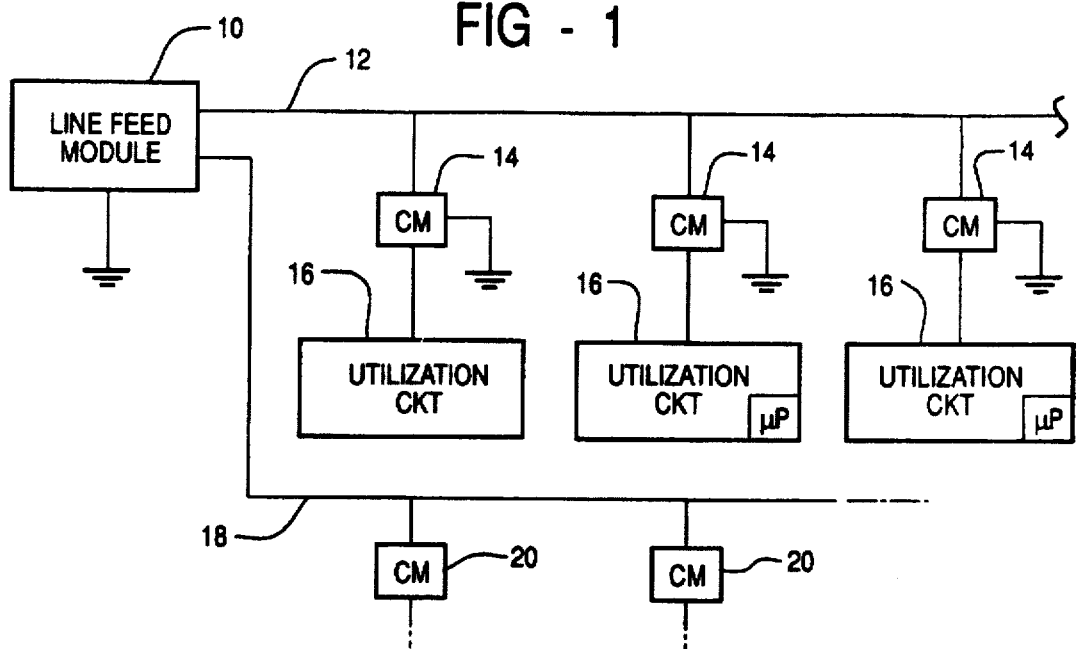
FIG. 1 is a block diagram illustrating a serial communication system, according to the invention.

Referring to FIG. 1, a digital link comprises a line feed module 10 coupled to ground and to a single wire transmission line 12 which is connected to a plurality of communication modules 14. Each module 14 is connected to ground and to an electrical circuit 16 which receives information from its associated communication module 14, and/or supplies information to the communication module 14. In the environment of an automotive vehicle, the electrical circuit 16 may be an engine control module, or a body computer, for example, each of which contain a microprocessor, or a simpler circuit which does not have a microprocessor. Additional digital links may be supplied by the same line feed module 10 as indicated by a second transmission line 18 having communication modules 20.

Figure 2:
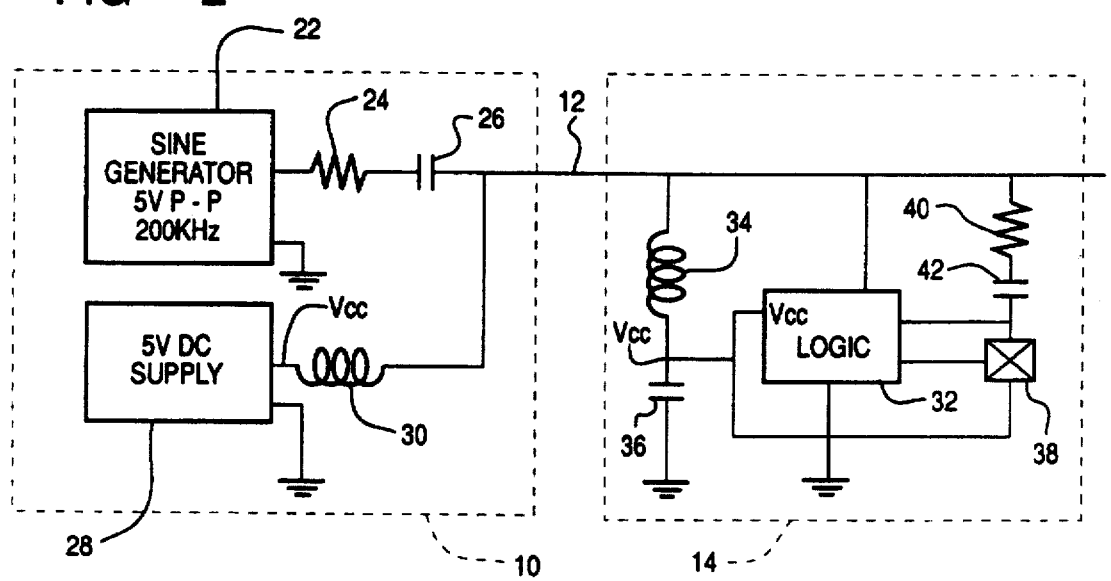
FIG. 2 is a schematic diagram showing circuit details of the system of FIG. 1.
Figure 3:
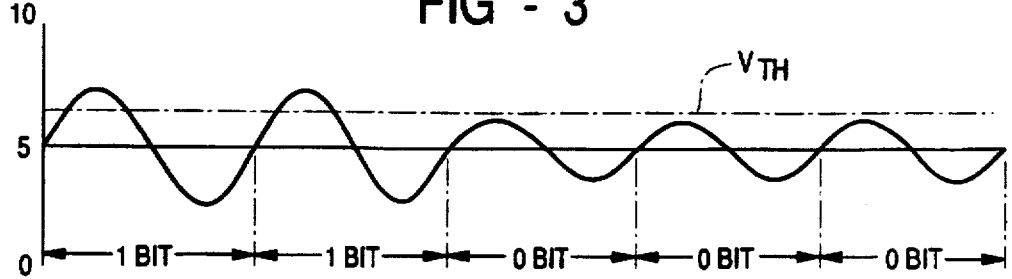
FIG. 3 is a waveform graph illustrating the signal used for energizing the communication of FIG. 1.

The line feed module 10, as shown in FIG. 2, comprises a sine wave carrier generator 22 having its output coupled through a resistor 24 and a capacitor 26 to line 12, and a dc supply 28 coupled through an inductor 30 to line 12. The dc supply voltage Vcc is preferably 5 volts and the sine generator imposes a 200 KHz 5 volts peak-to-peak signal on the dc voltage as shown in FIG. 3. The resistor 24 is small, say 150 ohms. The carrier signal can be attenuated by half, also shown in FIG. 3, by shunting the ac component on line 12 to +5 volts through a similar impedance in a communication module 14. This feature permits the module 14 to write on the carrier signal, each carrier period being one bit. The unattenuated amplitude of the sine wave corresponds to a binary 1 value and the attenuated value is 0 as indicated in FIG. 3. The signal amplitude is determined by testing one lobe of the sine wave by comparison to a voltage threshold $V_{TH}$. The ac signal is never completely shorted out so that the carrier wave is always available to clock each module 14 on the line. Each module generates a square wave synch signal by squaring the ac carrier.

The communication module 14, also shown in FIG. 2, includes a logic circuit 32 connected to the line 12 and to ground. The dc voltage on line 12 is applied as Vcc to the logic circuit by a filter comprising an inductor 34 and a capacitor 36 serially connected between the line 12 and ground. The ac signal is coupled from the line to the logic circuit and to a transmission gate 38 by a 150 ohm resistor 40 and a capacitor 42 in series. For writing by the module, the transmission gate is controlled by the logic circuit to conduct and shunt the ac signal to +5 volts to attenuate selected bits of the signal. The transmission gate is omitted when the module has a read only function.

Figure 4:
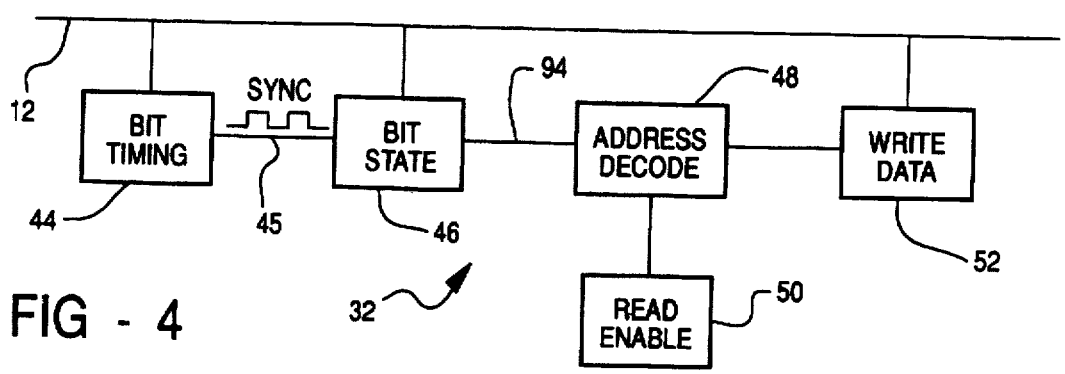
FIG. 4 is a block diagram of a typical logic circuit for a communication module according to the invention.

FIG. 4 indicates by a block diagram the components of a logic circuit 32 having full addressing capability. Simpler modules may omit the address function where it is not necessary to specify a target module on the line. Similarly a module will not necessarily need both a read and write function. A bit timing circuit 44 generates a synch signal from the carrier for circuit timing, and a bit state circuit 46 detects the value of each bit, clocking in a high or low voltage according to bit value. An address decoding circuit 48 compares initial bits to a stored value and if the address is valid, succeeding bits are read by a read enable circuit 50. When a write function is enabled a write circuit 52 is activated to write to the line by operating the transmission gate.

Figure 5:
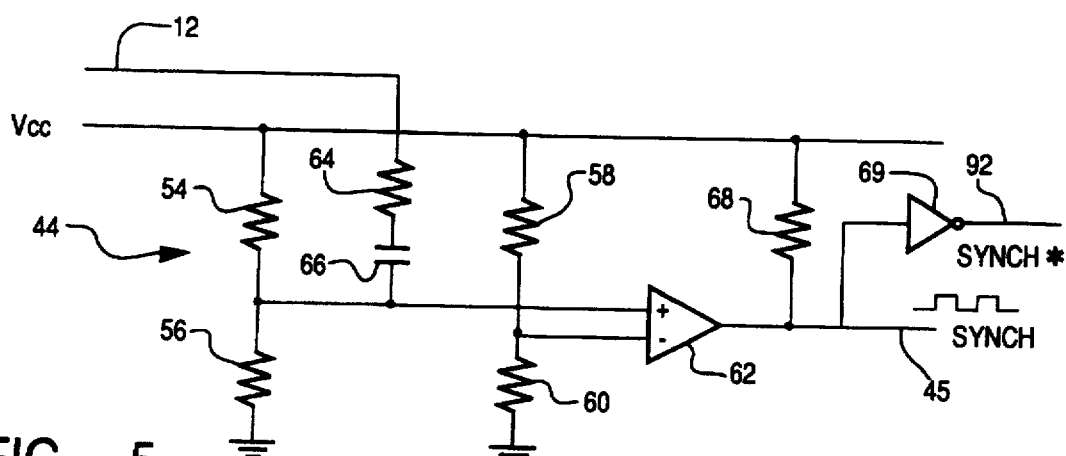
FIG. 5 is a schematic diagram of a bit timing circuit of FIG. 4.

FIG. 5 illustrates the operation of the bit timing circuit 44 which detects the beginning of each bit transmitted on the link. The beginning of the bit is defined as the "zero crossing" of the ac sine wave on the dc level which has a transition from a value below the dc level to a value above the dc level (rising edge). A pair of voltage dividers comprising resistors 54 and 56 and resistors 58 and 60, respectively, are connected between Vcc and ground to provide junction points which are connected to the inputs of a comparator 62. The ratios of the resistance values in the voltage dividers are equal, and all the resistors may, in fact, be equal so that the dc bias on the inputs are the same. A resistor 64 and capacitor 66 couple the ac signal on line 12 to the noninverting input of the comparator 62 so that any ac swing above or below the dc value causes a change in the comparator output state to generate a square wave synch signal on line 45. Each rising edge of the square wave is the start of a bit. A pull up resistor 68 is connected between the comparator 62 output and Vcc. All resistances used in this and following circuits are relatively large in value to avoid excessive dc loading of the link. An inverter 69 connected to the line 45 produces on line 92 a synch* signal which is the inverse of the synch signal.

Figure 6:
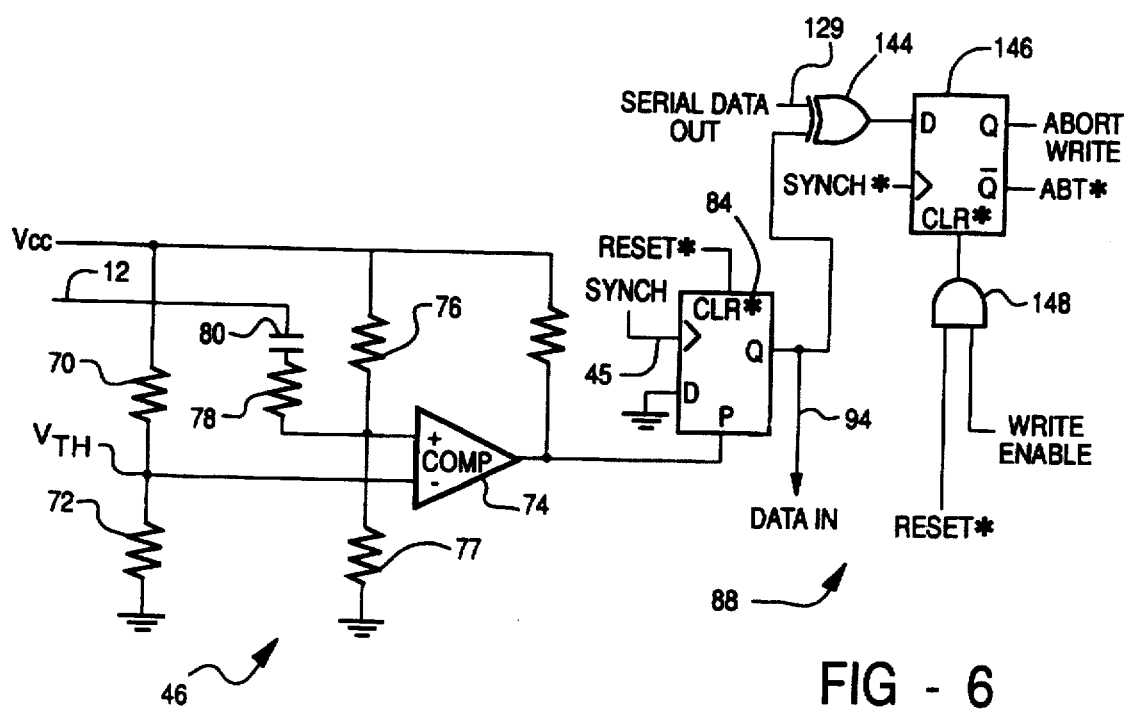
FIG. 6 is a schematic diagram of a bit state and priority determination circuit, according to the invention.

The bit state determination circuit 46 (as well as a contention resolution circuit 88) is shown in FIG. 6. Resistors 70 and 72 form a voltage divider having a junction connected to the inverting input of a comparator 74 and which sets the voltage threshold $V_{TH}$ above which a 1 state is detected. Resistors 76 and 77 are connected between Vcc and ground to set the line level which is coupled to the noninverting input, which input is also coupled through a resistor 78 and capacitor 80 to the line 12. The values of resistors 76 and 77 are much larger than the impedance of the resistor 78 and capacitor 80 at the carrier frequency. The comparator 74 output is connected to the preset input of a flip-flop 84. A RESET* signal is fed to the clear* pin of the flip-flop 84. In operation, the RESET* signal is a low going pulse provided to reset the state of the bit detection circuit after power-up, the reset occurring on the low state of the pulse or on the following rising edge depending on the design of the flip-flop. The comparator 74 produces a low going signal when the ac component of the line signal is below the threshold for a 0 detection. A high synch signal clocks flip-flop 84. The Q output is initially 0 because the ac signal is always below the comparator threshold on the rising edge of the synch signal. If the ac signal rises above the comparator level while the synch signal is high, Q will be set to a 1. Then the state of the Q output is sustained until the rising edge of the next synch signal to provide a data signal on line 94. The signal timing is shown in FIGS. 7a–7d. FIG. 7a shows the ac signal in comparison to the comparator threshold $V_{TH}$ for 1 state bits (high ac amplitude) and 0 state bits (low ac amplitude). The ac signal is squared to form the synch signal as depicted in FIG. 7b. When the ac signal is higher than the comparator threshold, the comparator output is high (FIG. 7c) and the flip-flop 84 Q output assumes the 1 state when the comparator output is high and maintains the 1 state until the beginning of the next synch pulse (FIG. 7d).

Figure 8:
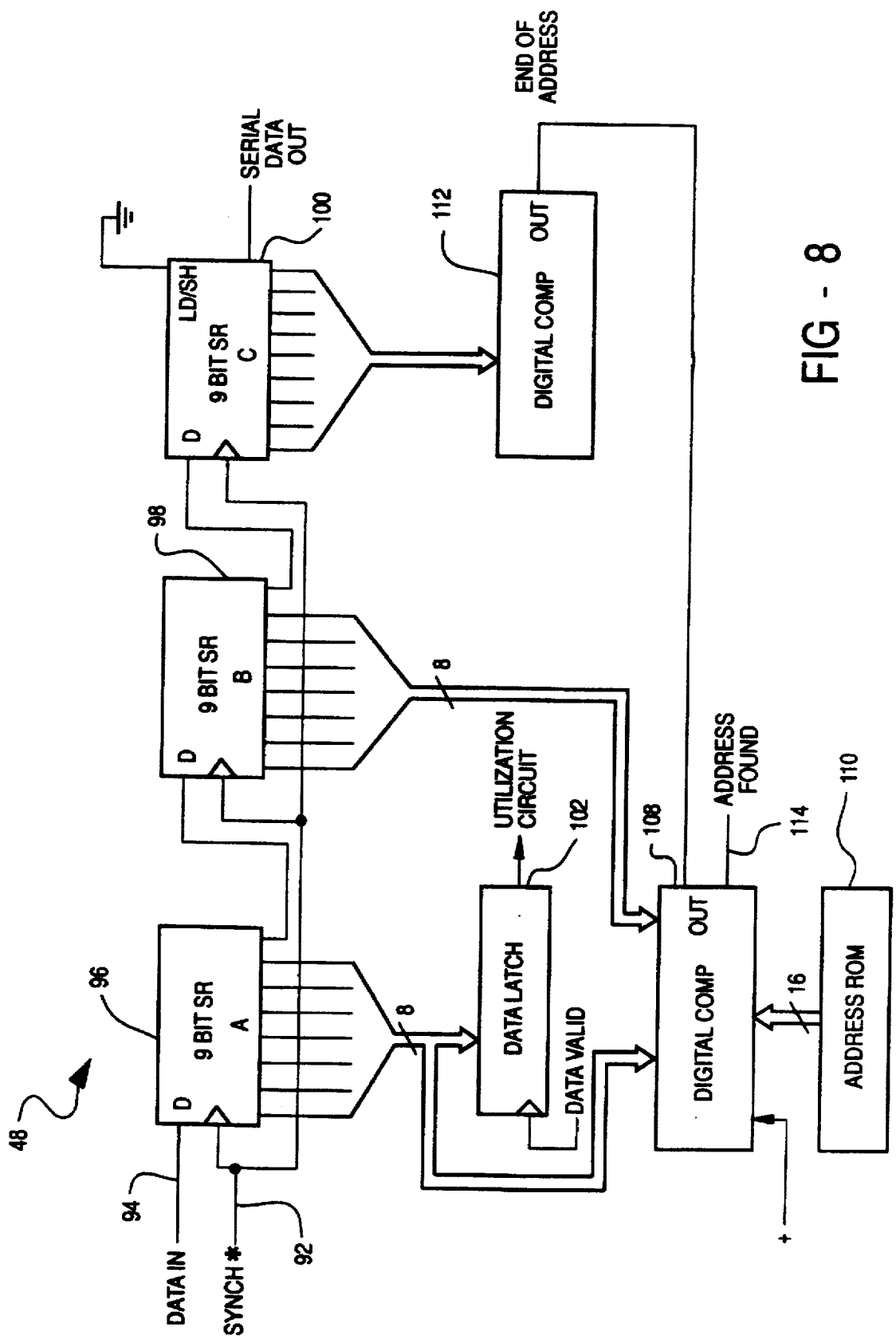
FIG. 8 is a schematic diagram of an address decoder circuit of FIG. 4.

The address decoding circuit 48 shown in FIG. 8 implements a protocol in which nine consecutive 1 bits is a marker for the beginning of an address, and subsequent packets of nine bits carry address or message data. Each packet begins (or alternatively, ends) with a 0 bit to insure that the data does not produce nine 1 bits which is reserved for a marker. The number of bits per packet is arbitrary; if the address marker has n bits, each packet shall comprise an initial 0 bit followed by n-1 data bits; more generally, each packet shall comprise n-1 consecutive data bits plus a terminal 0 bit. Here it is assumed that the address comprises two packets and any subsequent packets comprise the message data.

The decoder 48 comprises three serially connected nine bit shift registers 96, 98 and 100 having the data signal on line 94 as the input. The data are clocked through the registers by the synch* signal on line 92. The last eight bits of the register 96 are input to a data latch 102 which is activated when message data has been validated. The message data is then available to the utilization circuit. The last eight bits of each register 96 and 98 are input to a digital comparator 108 which compares them to an address ROM 110 which stores address bits. The leading 0 bits of each packet are thus ignored. The outputs of the shift register 100 are connected to a digital comparator 112 which issues an End of Address signal when nine 1 bits are detected. That signal is coupled to the comparator 108. In operation, the nine 1 bit marker occupies the register 100 causing the comparator 112 to issue the End of Address signal which triggers the comparator 108 to compare the 16 address bits in the registers 96 and 98 with the stored address. If a match occurs an Address Found signal is imposed on line 114.

Where the address is intended for the simple case of reading data, the read enable circuit 50 of FIG. 9 is employed. A flip-flop 116 is clocked by the Address Found signal on line 114 to assert an Addressed and an Addressed* signal. The Addressed signal is coupled to the clear pin of a nine count counter 118 to hold the counter clear until Addressed is asserted. The counter produces a carry signal which is coupled to an inverter 120 to produce a Data Valid* signal. An AND gate 122 has as inputs RESET*, ABT* and Data Valid* signals. In operation, assume for present purposes that RESFT* and ABT* are high signals. When the Addressed signal is low, the counter 118 is held clear and the Data Valid* signal is held high. The Addressed signal goes high when Address Found is asserted, enabling the counter. At the next synch signal the counter increments by one count. Upon receiving eight more bits the counter generates a carry signal and the Data Valid* signal goes low causing the flip-flop 116 to reset via AND gate 122, and causing the Addressed signal to go low to clear the counter. During these nine bits a complete message data packet is clocked into the shift register 96 of FIG. 8. The falling edge of the Data Valid* signal can be used to latch the data which is in the register 96 into the data latch 102.

Figure 10:
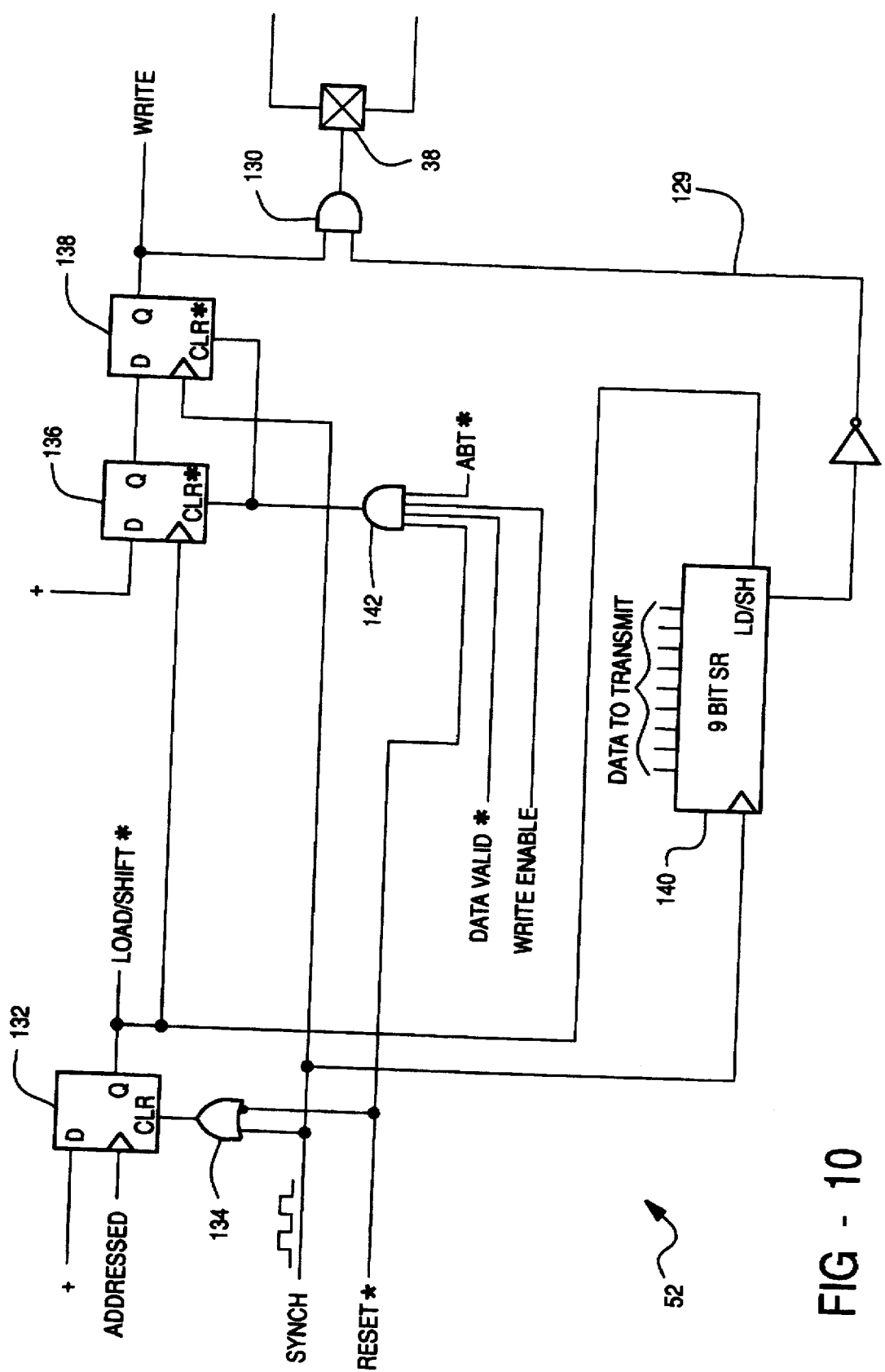
FIG. 10 is a schematic diagram of a write enable circuit of FIG. 4.

A module may be configured to transmit data onto the line 12 after being addressed by another module. After the address has been received, the nine bit message is loaded into the shift register 140 of FIG. 10 and then serially clocked to the transmission gate to write onto the line. As shown in FIG. 10 the register 140 has a load/shift terminal which, when activated by a high signal, causes data from the associated utilization circuit to be loaded into the register, and which then returns to its shift function when the signal goes low. During subsequent operation the data bits are clocked out over a data output line 129 to an AND gate 130, which also has a Write input to control a transmission gate 38. A flip-flop 132 is clocked by the Addressed signal and cleared by a high voltage applied via an OR gate 134 by the carrier synch signal or the RESET* signal. The Q output produces a Load/Shift* signal which clocks a flip-flop 136. The Q output of flip-flop 136 is connected to the data input of another flip-flop 138 which is clocked by the synch signal. Both flips-flops 136 and 138 are cleared when AND gate 142 goes low. The inputs to the AND gate 142 are RESET*, Data Valid* and Write Enable. When the address has been detected Addressed goes high and Load/Shift* goes high causing data to be loaded into register 140. When the synch signal rises one half bit later flip-flop 132 resets, allowing the register 140 to resume operation as a shift register. The output on flip-flop 136 goes high just after flip-flop 132 but it is not reset one half bit time later. At the beginning of the next bit time after Addressed is asserted, flip-flop 138 clocks the state of flip-flop 136 and provides a Write signal indicating that data is to be written onto the line 12. Data is written onto the line during that bit time. Writing continues for nine bit times and then terminates when Data Valid* goes low and resets the flip-flop 136 and flip-flop 138.

The above examples have involved a single master module on the link which ships out an address for a slave. The slave has then either responded by reading data sent by the master or by writing data to the bus. Even in this scheme, communications can exist between slaves using the master to coordinate activities. For example, two slaves can share a common address, but one slave can interpret the address as a read address and the other slave can assume it is a write address. The master sends the address, then one slave sends data to the other.

In the type of system just described, a master can occasionally poll slaves to see if they have information ready to be transmitted on the link. Special polling addresses can be established which allow each slave address to write one bit only of a message to indicate that they have data ready to be transmitted. In this way, one address can be used to survey multiple slaves—slave 1 writes bit 0, slave 2 writes bit 1 and so forth.

The serial link can also be used to implement a contention bus with multiple masters. In a contention bus, many communication modules could attempt to use the bus at the same time, but a protocol is established which allows only one module to dominate at a given time and retain control of the bus. For example, in the link mechanization described above a 0 bit dominates over a 1 bit when both bits are written to the bus at the same time. Thus a module which is writing the bus can also monitor the bus and if it ever finds that it is writing a 1 to the bus, but a 0 is read from the bus, then it can abort it's transmission. It then waits for the start of address protocol and then places the address of it's message on the link. Clearly, addresses which place 0's on the bus at earlier bit times tend to dominate over ones which have 1's. Thus a type of addressing priority is inherent in the protocol. Priorities can be explicitly implemented by assuming that a block of the first bits transmitted after the start of address marker is used specifically for determining priority. In this case, the address decoder comparators ignore the first block of bits when performing address matching. For example if the first few bits of register 98 are not coupled to the comparator 108, the corresponding bits in a reserved block in the address string will not be used for address matching but will be reserved for prioritizing. In the event that two communication modules simultaneously write the nine 1's to the bus to make an address marker, the module which first attempts to write a 1 in the reserved block will be frustrated and its transmission will be aborted as described below, and the other module, which writes a 0, will be dominant and continues to write an address string. The priority bits are only used to allow some messages to dominate over others when bus contentions arise. A system may also be implemented which allows modules to raise their priority levels after failing to attain bus access.

FIG. 6 includes a contention resolution circuit 88 which functions by aborting transmission when a conflict arises. An exclusive OR gate 144 has inputs connected to the Q output of flip-flop 84 and to the serial data output line 129 and its output is connected to the data input of a flip-flop 146. The synch* signal is coupled to the clock input and the reset terminal CLR* is connected through an AND gate 148 to RESET* and Write Enable. During a bit period the exclusive OR produces a high output if the two inputs are different, indicating a conflict. If a given module is writing a 0 bit, the data in will be a zero. The only time a conflict is detected is when the given module has a data out bit of 1 and another module writes a 0 bit. At the end of the bit period the exclusive OR output is latched by flip-flop 146 to form an abort signal ABT* which is low if there is a conflict. The low ABT* signal then is effective in the FIG. 9 circuit to remove the assertion of Addressed, and in FIG. 10 to clear flip-flops 136 and 138 to prevent writing to the line. Write Enable occurs either at the beginning of the writing of an address or at the beginning of the writing of message data.

The embodiments of the invention in which an exclusive property or privilege is claimed are defined as follows:

1. A digital communication link comprising:

a one-wire transmission line for carrying both data and power, and a common ground;

feed means for applying a dc voltage level to the line and a sine wave carrier imposed on the dc voltage level;

a plurality of communication modules coupled to the line;

at least one of the communication modules having means for writing data to the transmission line by selectively attenuating the amplitudes of individual cycles of the sine waves; and at least another of the communication modules having means for reading data on the transmission line by sensing the amplitudes of individual sine wave cycles.

2. The digital communication link as defined in claim 1 wherein the feed means is incorporated within one of the communication modules.

3. The digital communication link as defined in claim 1 wherein:

the at least one of the communication modules having means for writing address data to the transmission line followed by message data; and the at least another of the communication modules having means for reading data on the transmission line and having assigned addresses and means for responding to the address data for selectively reading the message data when the address data matches an assigned address.

4. The digital communication link as defined in claim 3 wherein the means for responding to the address data comprises memory for storing the assigned address, shift register means for receiving the address data, and comparator means for identifying address data corresponding to the stored address.

5. The digital communication link as defined in claim 3 wherein:

the means for responding to the address data comprises memory for storing the assigned address, shift register means for receiving the address data, and comparator means for identifying address data corresponding to the stored address and issuing an Address Found signal; and means responsive to the Address Found signal for reading the message data.

6. The digital communication link as defined in claim 1 wherein:

the at least one of the communication modules having means for writing address data to the transmission line; and the at least another of the communication modules having an assigned address and means for responding to the address data for selectively writing data to the transmission line when the address data matches the assigned address.

7. The digital communication link as defined in claim 1 wherein the means for writing data by selectively attenuating the amplitudes of individual cycles comprises:

means for detecting each sine wave cycle wherein each cycle is one data bit; and means for changing the amplitude of selected sine waves by shunting the sine wave to a reference voltage through an impedance.

8. The digital communication link as defined in claim 1 wherein the means for reading data by sensing the amplitudes of individual cycles comprises:

means for detecting each sine wave cycle wherein each cycle is one data bit; and means for comparing the sine wave amplitude for each bit to a threshold value, to assign a digital value according to its amplitude relative to the threshold.

9. The digital communication link as defined in claim 1 wherein:

the at least one of the communication modules having means for writing address data to the transmission line, wherein the initial bits of the address data comprise a priority code; and means for detecting the transmission of a higher priority code and aborting transmission of data having a lower priority code.

10. The digital communication link as defined in claim 9 wherein bits in the priority code comprising attenuated amplitudes signify higher priority than bits comprising unattenuated amplitudes; and the detecting means comprises logic means for aborting a write function of one communication module when the transmission line carries an attenuated sine wave while the one module is attempting to write a bit requiring an unattenuated sine wave.

11. A method of serial communication between electrical communication modules connected by a line, comprising the steps of:

applying a composite dc level and a sine wave carrier signal to the line wherein the dc level supplies power to the communication modules and each sine wave cycle defines a data bit;

writing data onto the carrier at one communication module by attenuating the sine wave carrier for selected bits; and reading data at another communication module by sampling each bit and detecting attenuated bits.

12. The method as defined in claim 11 wherein the communication modules have internal timed operations, the method further comprising:

controlling the timed operations of the communication modules by the carrier signal.

13. The method as defined in claim 11 wherein the communication modules have internal operations requiring synchronous timing, the method further comprising:

generating a synch signal in each communication module by squaring the carrier signal, whereby the several communication modules have synchronous timing signals; and timing operations of the modules by the respective timing signals.

14. The method as defined in claim 11 wherein said another communication module is addressed by the steps of:

storing an address code in said another communication module;

transmitting an address marker and address data following the marker;

detecting the address marker;

storing the transmitted data following the marker;

comparing the stored transmitted data with the stored address code; and asserting an Address signal when the stored transmitted data matches the stored address code.

15. The method as defined in claim 11 wherein said another communication module is addressed by the steps of:

storing an address code in said another communication module;

transmitting an address marker comprising n unattenuated bits;

detecting the address marker;

transmitting an address having at least one data packet comprising one attenuated terminal bit accompanied by n-1 consecutive address bits;

storing the transmitted address; and comparing the transmitted address with the stored address code, whereby said another communication module is activated for data transfer when the transmitted address matches the address code.

16. The method as defined in claim 15 further including transmission of message data following the address wherein the transmitted message data comprises at least one packet of bits, each packet having an unattenuated bit accompanied by n-1 consecutive data bits.

17. The method as defined in claim 11 wherein more than one communication module has the ability to write an address to the line and an address begins with an attenuated bit followed by an address string; a method of ordering priority among those communication modules that have the ability to write an address for preventing simultaneous addressing, comprising the steps of:

assigning at least one priority bit to the beginning of an address string, wherein an attenuated bit has higher priority than an unattenuated bit;

comparing each priority bit being written to the line by a module to the carrier bit; and aborting the addressing when the carrier bit is attenuated and the bit being written by the module is not attenuated.

* * * * *